United States Patent
Berris, Jr.

(10) Patent No.: US 8,161,823 B2
(45) Date of Patent: Apr. 24, 2012

(54) STRAIN AND DISPLACEMENT SENSOR AND SYSTEM AND METHOD FOR USING THE SAME

(75) Inventor: Richard E. Berris, Jr., Chagrin Falls, OH (US)

(73) Assignee: Pile Dynamics, Inc., Solon, OH (US)

( * ) Notice: Subject to any disclaimer, the term of this patent is extended or adjusted under 35 U.S.C. 154(b) by 361 days.

(21) Appl. No.: 12/606,367

(22) Filed: Oct. 27, 2009

(65) Prior Publication Data
US 2010/0101329 A1 Apr. 29, 2010

Related U.S. Application Data

(60) Provisional application No. 61/108,971, filed on Oct. 28, 2008.

(51) Int. Cl.
*G01L 1/00* (2006.01)
(52) U.S. Cl. .......................................................... 73/780
(58) Field of Classification Search ...................... 73/780
See application file for complete search history.

(56) References Cited

U.S. PATENT DOCUMENTS

| | | | |
|---|---|---|---|
| 3,974,332 A | | 8/1976 | Abe et al. |
| 4,030,347 A | * | 6/1977 | Norris et al. ..................... 73/769 |
| 4,359,720 A | * | 11/1982 | Chai et al. ........................ 341/26 |
| 4,420,754 A | | 12/1983 | Andermo |
| 4,526,043 A | | 7/1985 | Boie et al. |
| 4,543,526 A | | 9/1985 | Burckhardt et al. |
| 5,174,159 A | * | 12/1992 | Jacobsen et al. ................ 73/767 |
| 5,978,749 A | | 11/1999 | Likins, Jr. et al. |
| 6,301,551 B1 | | 10/2001 | Piscalko et al. |
| 6,533,502 B2 | | 3/2003 | McVay et al. |

OTHER PUBLICATIONS

What is a Capacitor? Kemet Electronics Corporation, Reprinted Jun. 2001, pp. 2-11.
International Search Report and Written Opinion, dated Dec. 9, 2009 in connection with PCT/US2009/062165, filed Oct. 27, 2009.
International Preliminary Report on Patentability dated May 12, 2011 in International Application No. PCT/US2009/062165, filed Oct. 27, 2009.

* cited by examiner

*Primary Examiner* — Lisa Caputo
*Assistant Examiner* — Octavia Davis-Hollington
(74) *Attorney, Agent, or Firm* — Rankin, Hill & Clark LLP

(57) ABSTRACT

A capacitively-coupled strain sensor and methods are presented in which the strain on a structure is measured by the varying capacitance created by the displacement of one or more boards attached to the structure.

19 Claims, 16 Drawing Sheets

STRAIN AND DISPLACEMENT SENSOR AND SYSTEM AND METHOD FOR USING THE SAME

REFERENCE TO RELATED APPLICATIONS

This application claims priority to and the benefit of U.S. Provisional Patent Application Ser. No. 61/108,971, which was filed Oct. 28, 2008, entitled A CAPACITIVELY-COUPLED CAPACITANCE-BRIDGE STRAIN SENSOR, the entirety of which application is hereby incorporated by reference.

INCORPORATION BY REFERENCE

U.S. Pat. No. 5,978,749 to Likins et al. discloses a pile installation recording system and is hereby incorporated by reference into this application in its entirety for showing the same. U.S. Pat. No. 6,301,551 to Piscalko et al. discloses a remote pile driving analyzer and is hereby incorporated by reference into this application in its entirety for showing the same. U.S. Pat. No. 6,533,502 to McVay et al. discloses a wireless apparatus and method for analysis of piles and is hereby incorporated by reference into this application in its entirety for showing the same.

BACKGROUND OF THE DISCLOSURE

Strain sensors are employed for measuring the shear strain on a structure. Conventional strain sensors use a flexible backing which supports a metallic foil pattern and are mounted to a structure. When the structure is deformed due to shear strain, the metallic foil is deformed, which alters the electrical resistance of the foil. By measuring the electrical resistance across the terminals of the foil, the strain of the structure may be measured. However, the metallic foil may become permanently deformed or detached from the backing over time. Thus, there is a continuing need for a robust strain sensor.

SUMMARY OF THE DISCLOSURE

The present disclosure provides a robust strain and displacement sensor apparatus and control techniques that may be employed to facilitate sensing of a wide range of factors including the shear strain on a structure.

More particularly, provided is a capacitively-coupled strain sensor, which includes a first board and a second board, both with conductive pads. An insulating layer is included between the boards to create a capacitive network from the conductive pads on the boards.

According to one aspect of the invention, provided is a capacitive network created by the boards and the insulating layer which creates a capacitive full bridge. In certain embodiments, the first board includes an oscillatory signal driver which produces an oscillatory signal, which is fed to conductive coupling pads on the first board. The oscillatory signal passes to the second board via the coupling capacitors of the capacitive network and returns to the first board via the signal capacitors of the capacitive network. The resulting signal is indicative of the amount of strain on the structure and/or the displacement of one board relative to the other board. The sensor can thus be used to perform a strain sensing function and/or a displacement calculation without a conductor linking the two boards.

According to other aspects, one or more additional board can be utilized for any of a number of uses including the support of electronics or even additional rigidity of the overall structure.

In yet other embodiments, additional capacitive networks could be formed with relation to these other boards.

These and other objects, aspects, features, embodiments and advantages of the invention will become apparent to those skilled in the art upon a reading of the Detailed Description of embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

Figure 1:
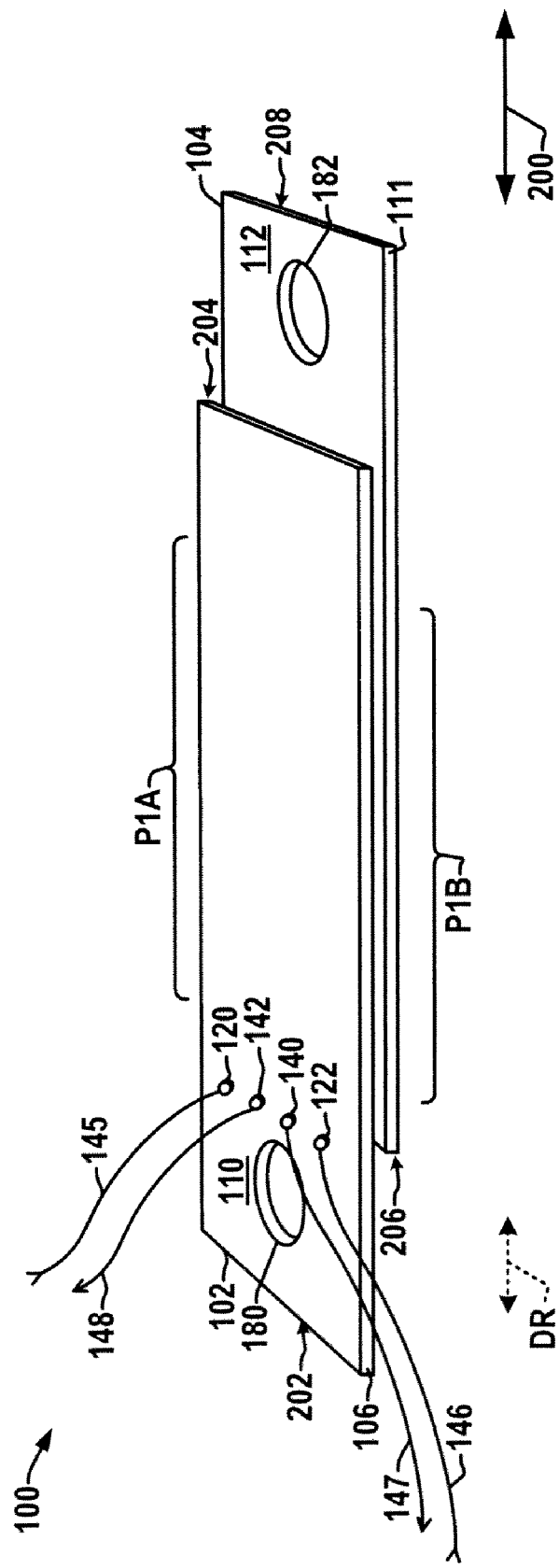
FIG. 1 is a perspective view of a strain and displacement sensor according to certain aspects of the invention of this application.

Referring now to the drawings wherein the showings are for the purpose of illustrating preferred and alternative embodiments of the invention only and not for the purpose of limiting same, FIGS. 1-6 illustrate a strain and/or displacement sensor 100 for use in connection with sensing the strain on an associated structure and/or the displacement between two objects. In this respect, the disclosed sensors can be used for a wide range of applications that monitor relative movement of two or more objects, for example to monitor a crack in a structural object such as a superstructure including roadway bridges. By securing the sensor of this disclosure to either side of the crack, the severity of the crack can be monitored. This and other systems and/or methods of using the disclosure will be discussed in greater detail below. In yet other embodiments, the sensors of this application can be imbedded into structural objects, such as a pile, to measure physical conditions such a static and/or dynamic strain which will also be discussed in greater detail below.

Figure 3:
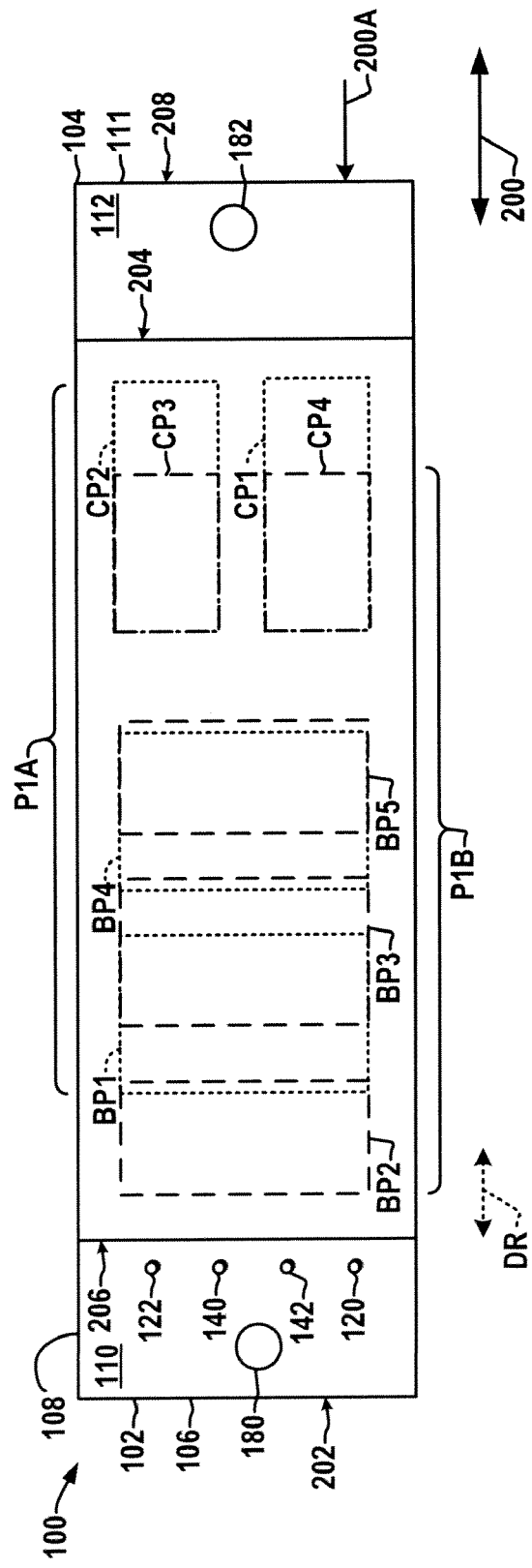
FIG. 3 is a top view of the sensor shown in FIG. 1 in an "inward" position.
Figure 4:
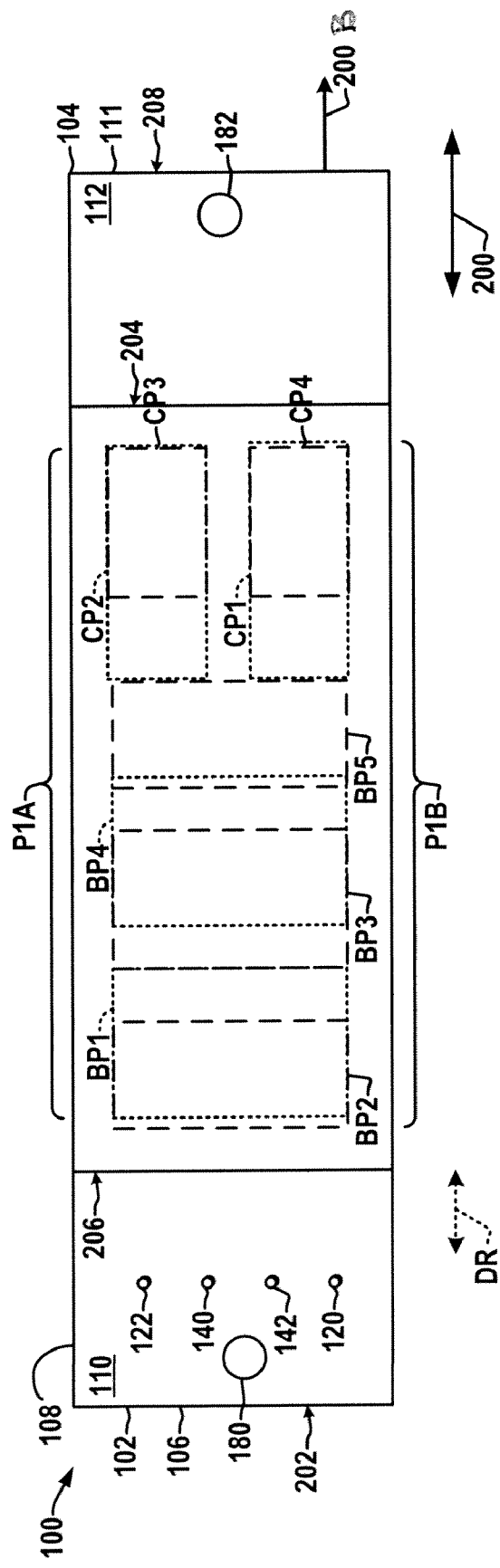
FIG. 4 is a top view of the sensor shown in FIG. 1 in an "outward" position.
Figure 5:
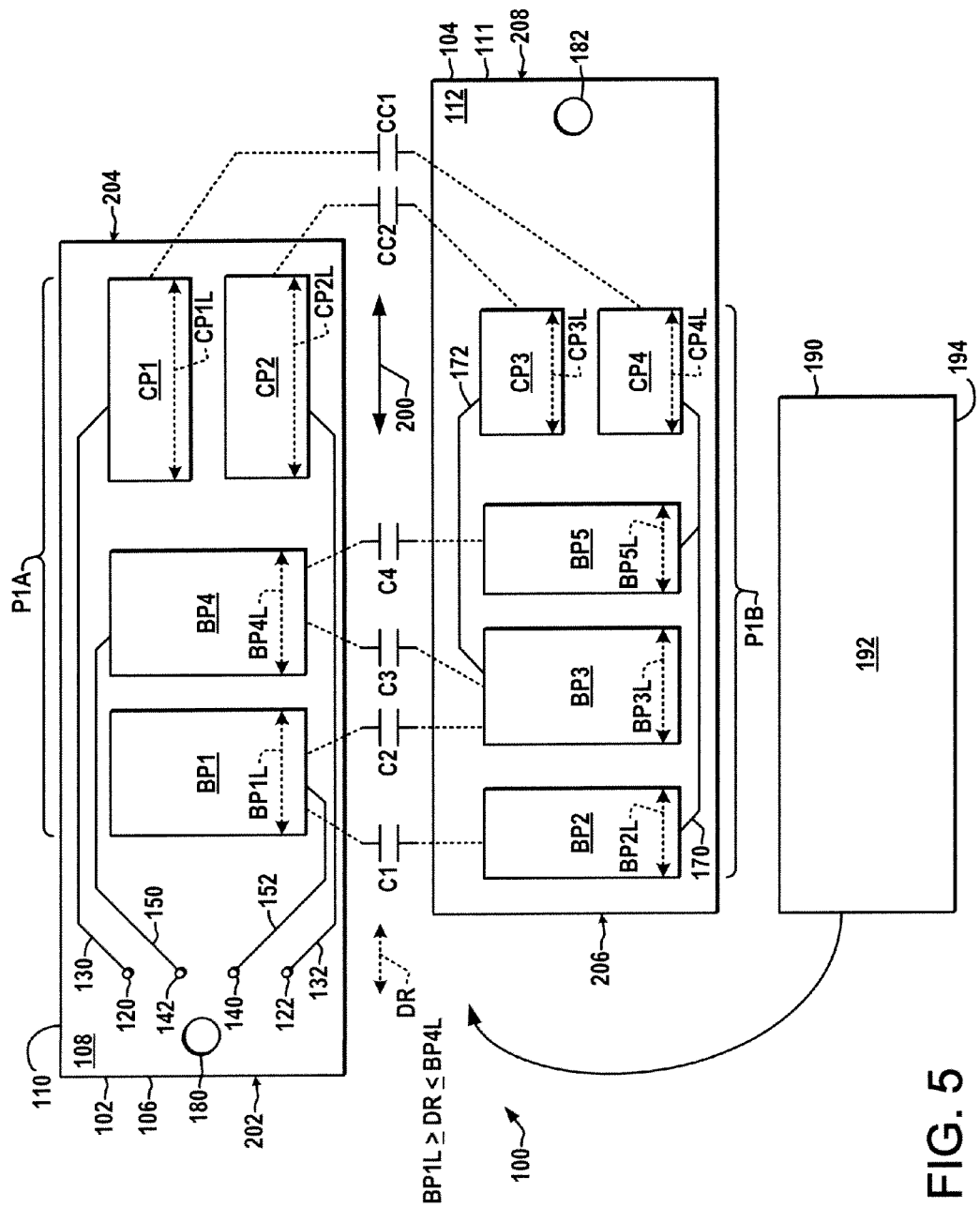
FIG. 5 is a butterfly view of the boards of the sensor shown in FIG. 1.

A sensor 100 is illustrated in FIGS. 1-6 for detecting displacement and/or strain in an associated structure, which includes first and second boards 102 and 104, respectively, mounted to allow relative motion of at least first portions P1A and P1B thereof, respectively, along a displacement direction 200 for selectively changing capacitances created by dielectric material situated between inwardly facing conductive pads on the boards 102, 104. The capacitances thus created are coupled in a full or half-bridge circuit together with coupling capacitors allowing measurement or detection of the relative board positions by bridge capacitance measurement techniques. Referring in particular to FIG. 5, a butterfly view of the facing surfaces of the boards 102 and 104 is provided, where the illustrated board surfaces 108 and 112 of the respective first and second boards 102 and 104 in practice face one another, as shown in FIGS. 1-4.

Figure 6:
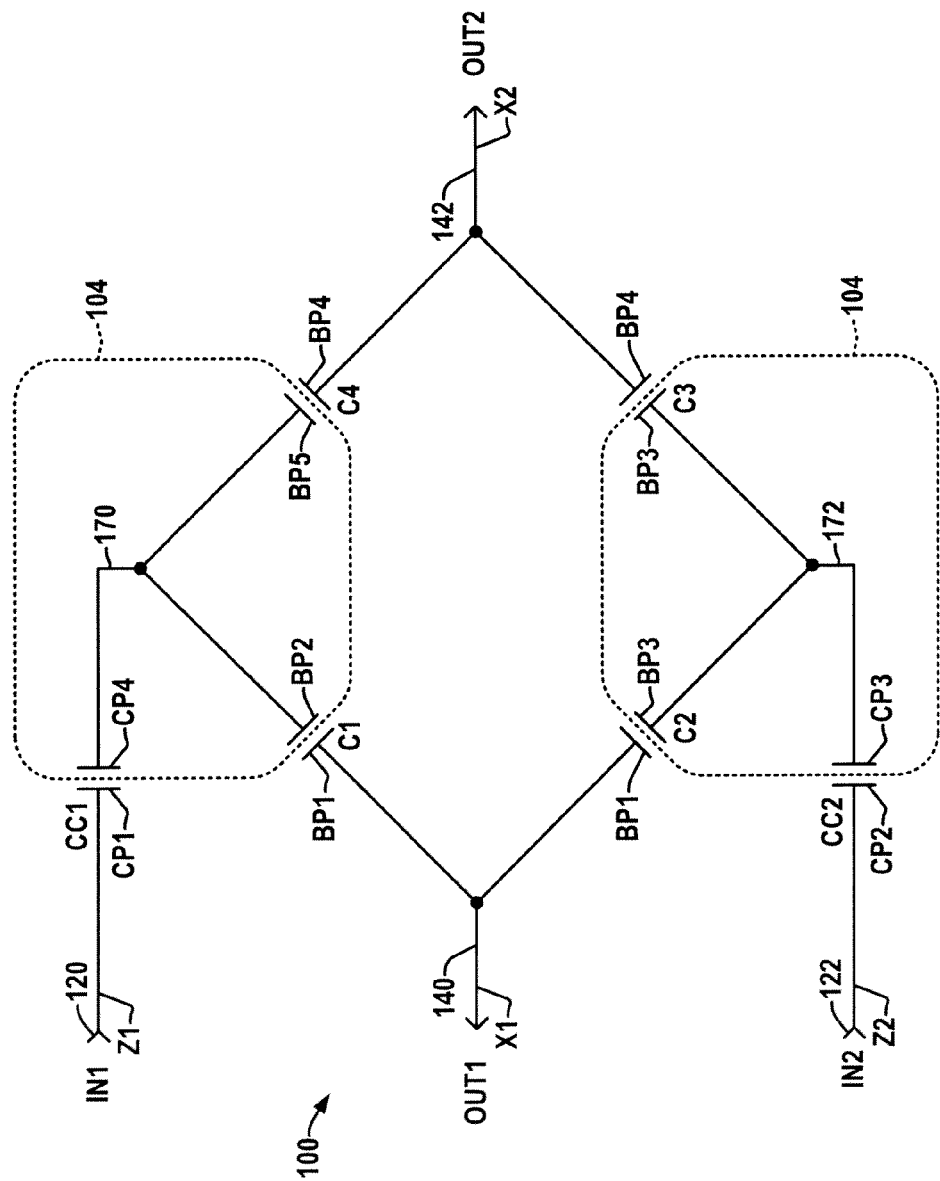
FIG. 6 is a schematic diagram illustrating the circuit representation of the sensor shown in FIG. 1.

The first board 102 includes a substrate 106 with an inwardly facing surface 108 and an outward surface 110 extending in the displacement direction 200 between a first end 202 and a second end 204, and includes a first portion P1A. The board 102, and the second board 104 may be fashioned using any suitable type or form of substrate that accommodates formation or placement of conductive pads on a surface (e.g., surfaces 108, 112) thereof, such as conventional FR4 type fiberglass circuit board substrates in one example, of any suitable thickness to implement sensing of strain/displacement in the above mentioned or other applications. As best shown in FIG. 5, the first portion P1A of board 102 includes a first electrically conductive coupling capacitor pad CP1 on the inward surface 108, which is electrically coupled with a first input IN1 120 (FIG. 6). A second electrically conductive coupling capacitor pad CP2 is provided on the surface 108 and is coupled with a second input IN2 122. The pads CP1 and CP2 are used for creating coupling capacitors CC1 and CC2 (FIG. 6) for the resulting full bridge circuit of the sensor 100. The surface 108 of board 102 further includes a first electrically conductive bridge capacitor pad BP1 coupled with a first output OUT1 140 used for forming variable bridge capacitances C1 and C2, as well as a fourth electrically conductive bridge capacitor pad BP4 used in forming bridge capacitances C3 and C4 connected to OUT2, 142.

The second board 104 is formed using a second substrate 111 with an inwardly facing surface 112 extending in the displacement direction 200 between a first end 206 and a second end 208, where the second board 104 is spaced in the assembled sensor 100 from the first board 102 with the inwardly facing surfaces 108, 112 facing one another and forming a gap therebetween, as shown in FIGS. 1-4. The gap includes a dielectric material, which is air in one embodiment, and which can be a separate dielectric material 190 (FIG. 5), and which can be a combination of separate dielectric material and air, and where the dielectric material 190 may be formed as part of one or both the boards 102, 104, such as a coating on one or both of the surfaces 108, 112 or portions thereof. The second board 104 includes a first portion P1B with a third electrically conductive coupling capacitor pad CP3, where at least a portion of the third coupling capacitor pad CP3 faces at least a portion of the second coupling capacitor pad CP2 of board 102 to form a first coupling capacitor CC2 via the dielectric in the gap between the boards 102, 104. Board 104 also includes a fourth electrically conductive coupling capacitor pad CP4, at least a portion of which faces at least a portion of the pad CP1 on the first board 102 to form a second coupling capacitor CC1 via the dielectric in the gap between the boards 102, 104.

The second board 104 further includes a second electrically conductive bridge capacitor pad BP2, which is coupled with the fourth coupling capacitor pad CP4, where at least a portion of the pad BP2 faces at least a first portion of the pad BP1 on the first board 102 to form a first bridge capacitor C1 via the dielectric in the gap between the boards 102, 104. Board 104 also includes a third electrically conductive bridge capacitor pad BP3 coupled with the third coupling capacitor pad CP3, with at least a first portion pad BP3 facing at least a second portion of the pad BP1 on the first board 102 to form a second bridge capacitor C2 via the dielectric in the gap between the boards 102, 104.

In the full bridge embodiment of FIGS. 1-6, the pad BP4 of the first board 104 is coupled with a first output OUT2, 142, and at least a first portion of the pad BP4 faces at least a second portion of the pad BP3 of the second board 104 to form a third bridge capacitor C3 via the dielectric in the gap between the boards 102, 104. In addition, the second board 104 in this embodiment includes a fifth electrically conductive bridge capacitor pad BP5 that is coupled with fourth coupling capacitor pad CP4, where at least a portion of the pad BP5 faces at least a second portion of the pad BP4 of the first board 102 to form a fourth bridge capacitor C4 via the dielectric in the gap between the boards 102, 104.

Figure 2:
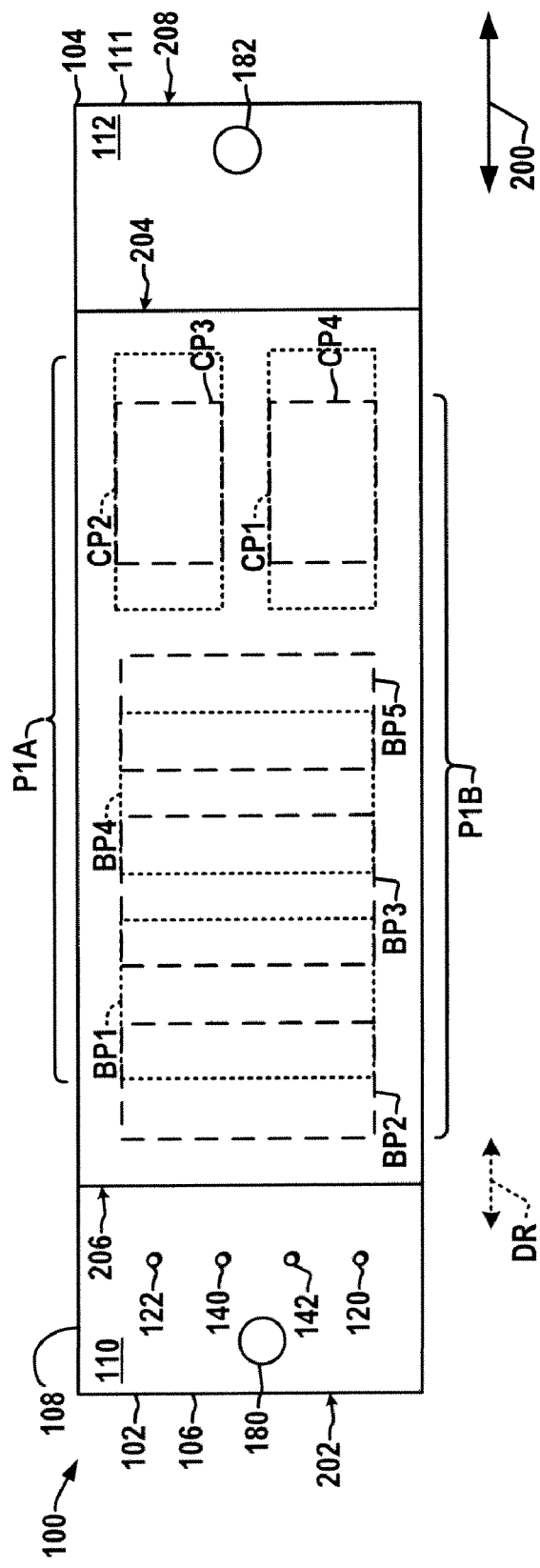
FIG. 2 is a top view of the sensor shown in FIG. 1 in a "home" position.

Referring particularly to FIGS. 2-4, and as discussed further hereinafter, the sensor 100 includes one or more mounting structures operative to support the boards 102 and 104 relative to one another with one or both of the first portions P1A and P1B displaceable relative to the other throughout the displacement range DR in the displacement direction 200 such that the bridge capacitors C1, C2, C3, C4 vary to facilitate measurement of strain and/or displacement of one or more structures to which the boards 102 and 104 are mounted using holes 180 and 182 thereof, respectively. In the half-bridge embodiment 400 of FIGS. 8 and 9 below, the mounting provides for variation of two bridge capacitors C1 and C2 as the first board portions P1A and P1B are relatively displaced along the direction 200. In the illustrated full and half-bridge embodiments 100 and 400, moreover, the first and second coupling capacitors CC1, CC2 remain constant as the first portions P1A and P1B are relatively displaced throughout at least a portion of the displacement range DR in the displacement direction 200, although not a strict requirement of the present disclosure. The embodiments disclosed herein advantageously require no electrically conductive wires or other conductive connections between the boards 102 and 104, and no external connections to the second board 104.

Figure 16:
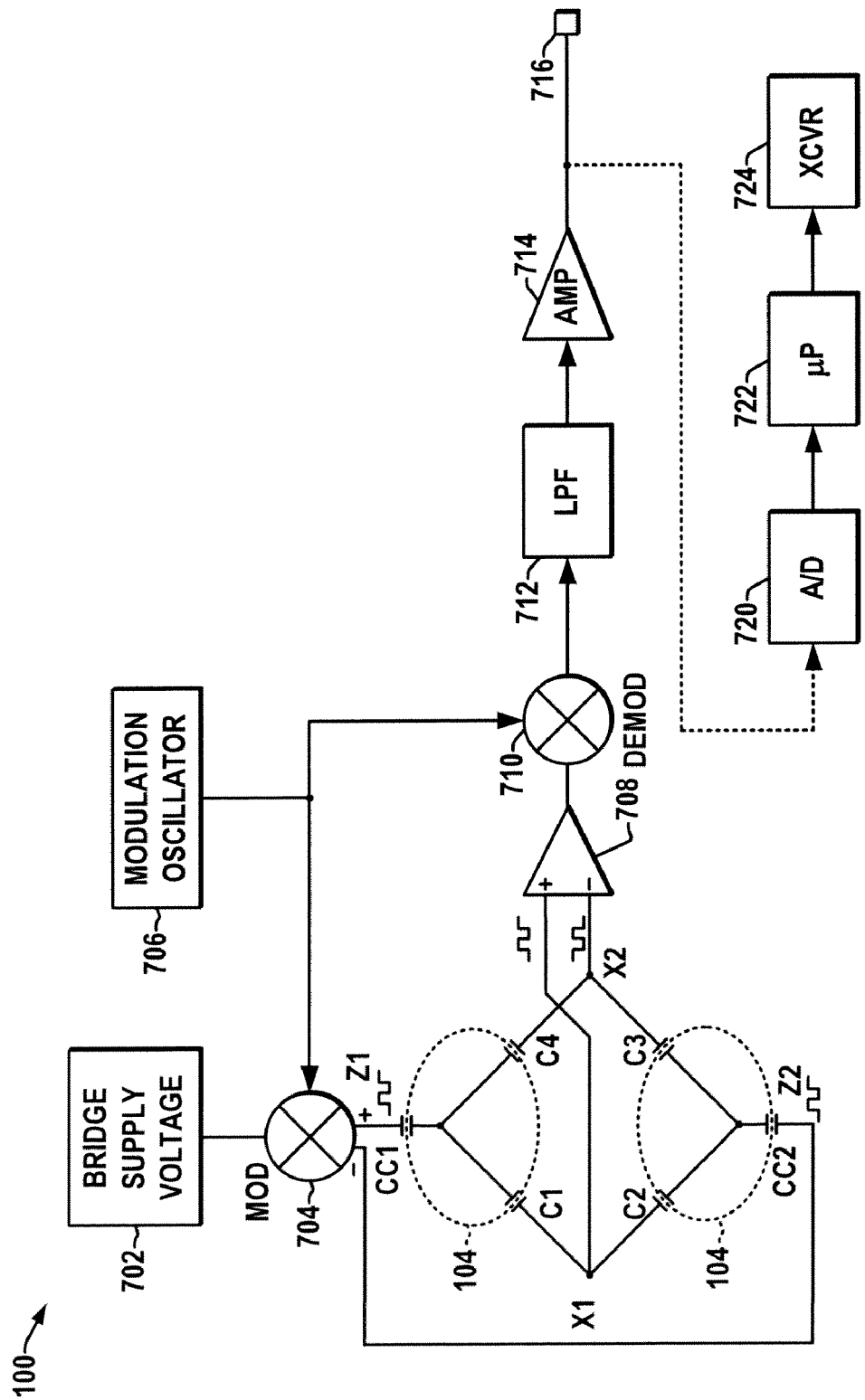
FIG. 16 is a schematic diagram illustrating the circuit representation of yet another embodiment of the invention of this application; and, FIG. 17 is perspective view of even yet another embodiment of the application including a dual spring configuration.

FIGS. 2-4 show top plan views of the sensor 100 with the first portions P1A and P1B thereof in three exemplary relative positions within the displacement range DR, with the pads BP1, BP4, CP1, and CP2 of the first board 102 (facing downward toward the second board 104) shown in dashed line form, and with the pads BP2, BP3, BP5, CP3, and CP4 of the second board 104 (facing upward toward the first board 102) shown in dotted lines. In FIG. 2, the sensor 100 is in a central position, wherein the pad BP1 overlaps equal portions of BP2 and BP3 such that bridge capacitors C1 and C2 are of equal capacitance in the bridge circuit, and wherein the pad BP4 of the first board overlaps equal portions of second board pads BP3 and BP5 so that capacitors C3 and C4 are equal. As one or both of the first portions P1A and P1B of the boards 102 and 104 are moved relatively inward in FIG. 3, BP1 overlaps less of BP2 and more of BP3, while BP4 overlaps less of BP3 and more of BP5. Conversely, as the relative displacement of the first portions P1A and P1B of the boards 102 and 104 proceeds outward as in FIG. 4, BP1 overlaps more of BP2 and less of BP3, while BP4 overlaps more of BP3 and less of BP5. In this manner, the bridge capacitors C1-C4 vary with the relative positions of the board portions P1A and P1B, and the capacitor bridge coupling of these capacitors (best shown schematically in FIG. 6) provides for output signal X1, X2 from which the displacement can be measured. This, in turn, allows electrical measurement of displacement and/or strain using suitable driver circuitry as shown in FIG. 16. In this embodiment, moreover, the coupling capacitor pads CP3 and CP4 of the second board are entirely overlapped by the corresponding first board pads CP2 and CP1, respectively, throughout the entire displacement range DR, whereby the coupling capacitors CC1 and CC2 remain constant throughout.

These relative relationships of the board pads, the displacement range DR, and the capacitors is set at least partially in this embodiment by the lengths of the board pads in the direction 200, as well as by the relative positioning of the pads. As shown in FIG. 5, the bridge capacitor pad BP1 has a length BP1L, pad PB2 has a length BP2L, pad BP3 has a length BP3L, pad BP4 has a length BP4L, and pad BP5 has a length BP5L, and the displacement range DR is set such that $BP1L \geq DR \leq BP4L$, although not a strict requirement of the present disclosure. Similarly, the exemplary half-bridge implementation of FIGS. 8 and 9 has a displacement range DR set such that $BP1L \geq DR$. The sensor 100 and boards 102 and 104 can come in a wide range of sizes and sensitivities without detracting from the aspects of the present disclosure. In this respect, it has been found that the sensor of this application can detect very minor movement and/or strain (such as those measured in microns) or even monitor a large crack in a superstructure. Thus, the overall size and configuration of the sensors can range significantly depending on the particular use or application of the sensor without detracting from the invention of this application.

The pads CP1-CP4 and BP1-BP5 can be made of any suitable conductive material, such as but not limited to, copper, aluminum or other materials known in the art having conductive properties, such as conductive copper or aluminum traces and pads formed using conventional printed circuit board fabrication techniques and materials. In the illustrated embodiment of FIGS. 1-6, first board 102 includes a positive input 120 which can be positioned on board 102 and a negative input 122 which can also be positioned on board 102 (best shown in FIGS. 5 and 6), and which may be coupled with on-board driver circuitry or may be externally accessible through a connector or other suitable connection means. Input 120 and input 122 are configured to receive a differential signal Z1 and Z2 and conduct that differential signal to pads CP1 and CP2, respectively. Pad CP1 is electrically connected to input 120 by way of a conductor or trace 130 and pad CP2 is electrically connected to input 122 by way of a conductor or trace 132 wherein conductors 130 and 132 can be embedded in and/or routed on the surface of the substrate 106 or configured in any way known in the art which will be discussed in greater detail below.

Board 102 can further include outputs 140 and 142 that are configured to produce an output signal X1 and X2 received from pads BP4 and BP1, respectively. As with the above mentioned inputs, the outputs 140 and 142 may be coupled with on-board receiver circuitry or may be externally accessible through a connector or other suitable connection means. Pad BP4 is electrically connected to output 142 by way of a conductor 150 and pad BP1 is electrically connected to output 140 by way of a conductor 152 wherein conductors 150 and 152 also can be embedded in base 106 or configured in any way known in the art which will be discussed in greater detail below. Output signals X1 and X2 are differential signals derived from the pad BP4 and pad BP1 which will be discussed in greater detail below. Wire leads 145-148 can be joined to Inputs 120 and 122 and outputs 140 and 142, respectively, and can be used to join sensor 100 to other devices and these other devices will be discussed in greater detail below. As a result of this configuration, all communication and power aspects of the sensor are joined to only electronics board 102 and board 104 is isolated.

Similarly, second or isolated board 104 pads BP2, BP3, BP5, CP3, and CP4 are formed of a conductive material and are positioned on inward surface 112 of substrate 111. As referenced above, in at least this embodiment, board 104 is an isolated board such that it has no external inputs or outputs in direct electrical connection with the pads, and there are no wires or other connectors physically coupling the boards 102, 104 to one another. Rather, the capacitor pads of the second board 104 are joined to the pads of board 102 by capacitive couplings. Pad CP4 of second board 104 is coupled to pads BP5 and BP2 by way of a connector or trace 170 on board 104 which can be any form of connection means known in the art. Similarly, pad CP3 is electrically coupled to pad BP3 by connector or trace 172 on board 104.

As will be discussed in greater detail below, board 102 can include a mounting arrangement including, but not limited to, a mounting hole 180. Board 104 can also include a mounting arrangement which can be the same as the mounting arrangement of board 102 or can be a different mounting arrangement based on the particular application or use of the device. In one embodiment, the mounting arrangement for the second board 104 is a mounting hole 182 similar to that of mounting hole 180. Mounting holes 180 and 182 can be used to mount sensor 100 to a structure or mount the sensor 100 to two different structures (not shown) wherein sensor 100 can be used to help monitor any relative movement between structures or portion of structures. As referenced above, this can include mounting the sensor 100 on either side of a crack to help monitor whether or not the crack is worsening. Again, this will be discussed in greater detail below.

Sensor 100 in one embodiment further includes a non-conductive, dielectric or spacing layer 190 (FIG. 5) having a first surface 192 and an oppositely facing second surface 194 which, when assembled, electrically separates boards 102 and 104. Layer 190 can be any known dielectric. This includes one embodiment wherein layer 190 is a gap including, but not limited to, an air gap between the boards, and a dielectric may be formed on one or both of the board surfaces between the pads of one or more of the bridge and/or coupling capacitors.

In the assembled condition, spacer and/or dielectric 190 is positioned between boards 102 and 104 such that surface 192 of spacer 190 faces surface 108 of board 102. Similarly, surface 194 of spacer 190 faces surface 112 of board 104. Spacer 190 between boards 102 and 104 separates the pads of the boards wherein there is no direct electrical connection between the boards 102 and 104, but this arrangement produces a capacitance connection between the pads. However, while spacer 190 is shown as a separate layer, it should not be limited to a separate layer wherein any type of dielectric or application of a dielectric can be utilized including, but not limited to, dielectric coatings and/or a spacing between the plates. Thus, throughout this application, reference to a dielectric, spacing or any other reference to the separation of the pads can be any structure that electrically separates the pads including, but not limited to, a separate non conductive material, coatings on one or more boards and/or an air gap, or combinations thereof. Further, the spacing between the boards can vary without detracting from the invention of this application. However, for example only, the spacing for smaller sensors can be in the range of 10 to 20 mils. It is noted, moreover, that while the exemplary pads of the boards 102 and 104 are shown as being generally coextensive in the lateral direction (e.g., vertical direction in FIGS. 2-5 and 8), and of generally rectangular shape, these attributes are not requirements of the present disclosure.

In this assembled condition, boards 102 and 104 are configured to move relative to one another. This relative movement can be free relative movement which can be used to monitor any relative movement between two objects or two portions of the same object. The relative movement, moreover, can include resistance such that a degree of force, or movement force, is required to produce the relative movement of the boards or at least the first portions P1A, P1B thereof. Such implementations can be used to measure an applied force if the spring constant or movement force is known. The illustrated sensor 100, moves between a "home" position shown in FIG. 2 and an "inward" position shown in FIG. 3 and/or an "outward" position shown in FIG. 4. In each of these positions, boards 102 and 104 of sensor 100 have their respective inward surfaces 108 and 112 facing one another and the conductive pads of the boards are facing each other in a central alignment. However, it should be noted that it is not necessary to have this "home" position to be a central home position even though it has been found that this works best in many embodiments of the invention of this application. Moreover, the boards 102 and 104 need not be strictly parallel with one another.

With respect to the "home" position (FIG. 2), in this embodiment it is a generally centered position. However, as can be appreciated, this is not required in that an increased range of sensing or travel can be achieved by offsetting the "home" position. Accordingly, in the "home" position of this embodiment, pad CP4 of board 104 is generally centered over pad CP1 of board 102. Similarly, pad CP3 of board 104 is generally centered over pad CP2 of board 102. In this and other embodiments, one pad can be longer in direction 200 to allow for the relative travel between the two boards such that the capacitor connection is maintain throughout the range of travel. Pad BP4 is generally centered between pads BP5 and BP3 wherein the amount of overlap with each pad is approximately equal. Similarly, pad BP1 is generally centered between pads BP3 and BP2 wherein the amount of overlap between each pad is again approximately equal.

As the sensor moves from the "home" position to the "inward" position shown in FIG. 3, the overlap between these pads changes which can be used to determine the strain and/or displacement of the boards of the sensor which will be discussed in greater detail below. In particular, pad BP4 moves toward pad BP5 such that the overlap with pads BP5 increases and the overlap with pad BP3 decreases. Similarly, pad BP1 moves toward pad BP3 such that the overlap with pad BP3 increases and the overlap with pad BP2 decreases. This change in overlap affects the capacitance between the structures which can be used to determine strain and/or displacement which will be discussed in greater detail below. However, in that pads CP1 and CP2 are elongated in direction 200, the overlap between pad CP4 and pad CP1 remains generally constant albeit shifted inwardly. Similarly, the overlap between pad CP3 remains generally constant with respect to pad CP2.

As the sensor moves from the "home" position to the "outward" position shown in FIG. 4, the overlap between these pads again changes which can be used to determine the strain and/or displacement of the boards of the sensor. In particular, pad BP4 moves away from pad BP5 such that the overlap with pads BP5 decreases and the overlap with pad BP3 increases. Similarly, pad BP1 moves toward pad BP2 such that the overlap with pad BP2 increases and the overlap with pad BP3 decreases. This change in overlap affects the capacitance between the structures which can be used to determine strain and/or displacement which will be discussed in greater detail below. Again, the overlap between pad CP4 and pad CP1 and between CP3 and CP2 remain generally constant albeit shifted outwardly. As will be discussed in greater detail below, the sensors of this application can be used for a wide variety of monitoring activities wherein some of these include single direction movement in either direction 200A or 200B. In these embodiments, the home position may not be centered as is discussed above. Accordingly, for any embodiment, the "home" position is not to be limited to a centered position. Further, other uses can include the monitoring of movement in both directions 200A and 200B.

Figure 9:
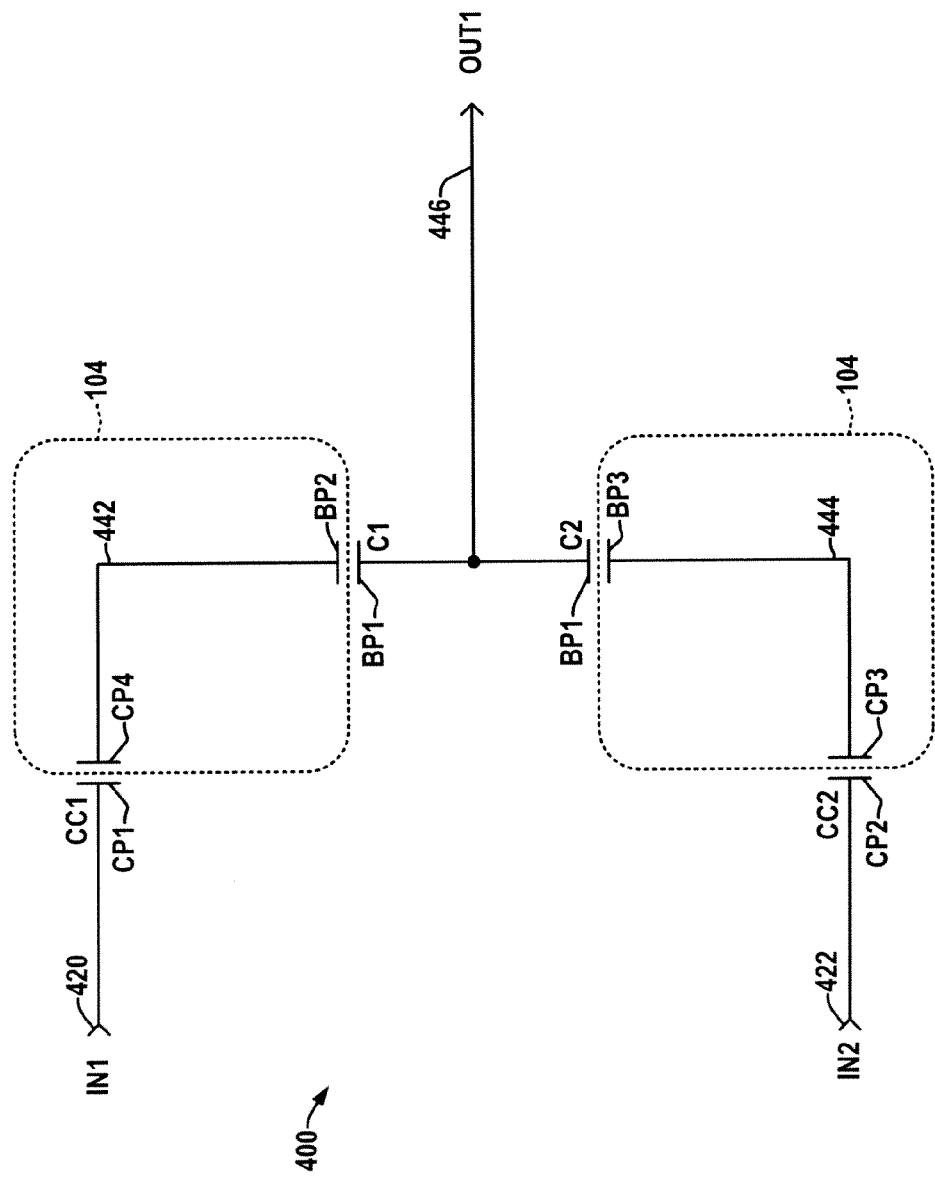
FIG. 9 is a schematic diagram illustrating the circuit representation of the exemplary strain sensor of FIG. 8.
Figure 10:
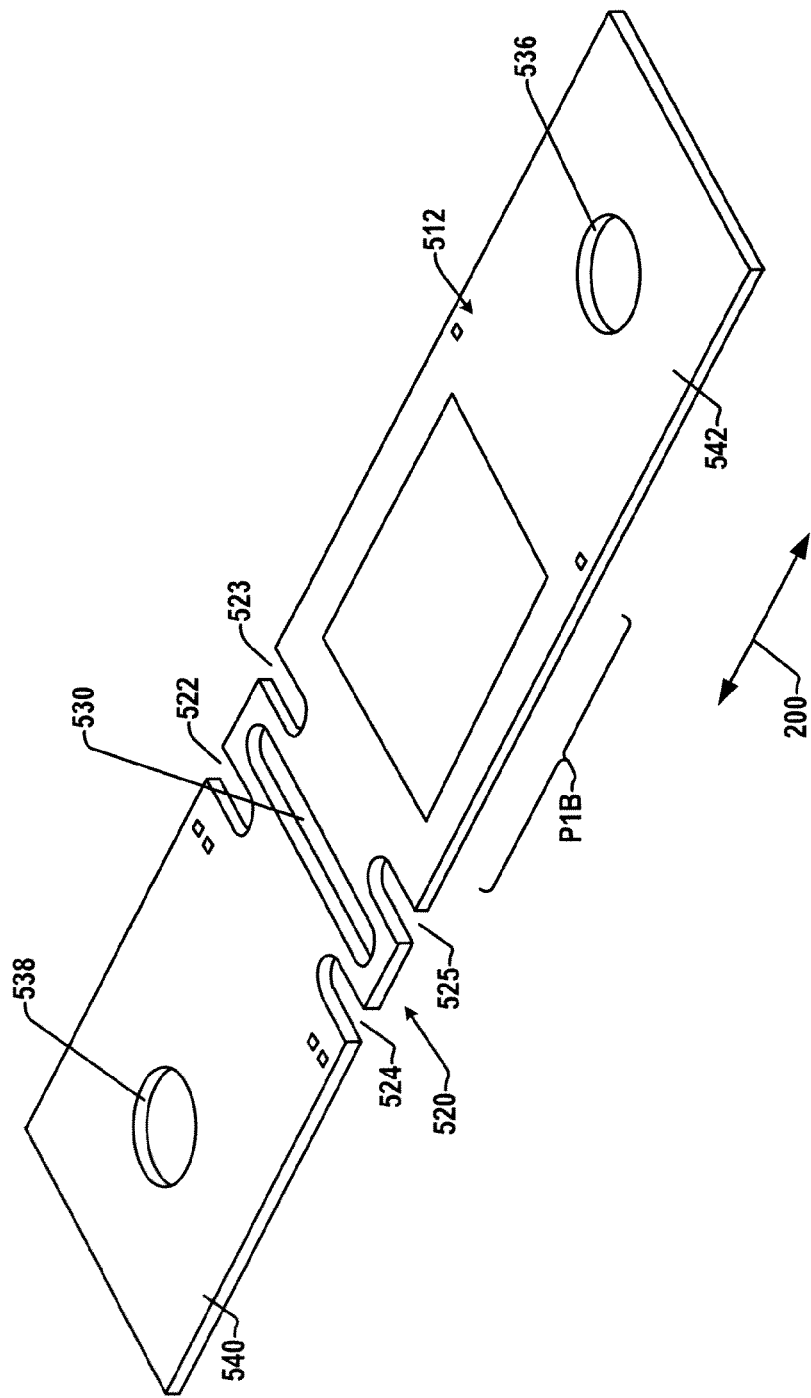
FIG. 10 is a perspective view of yet a board from another embodiment of the invention of this application which includes a deformable board section.
Figure 11:
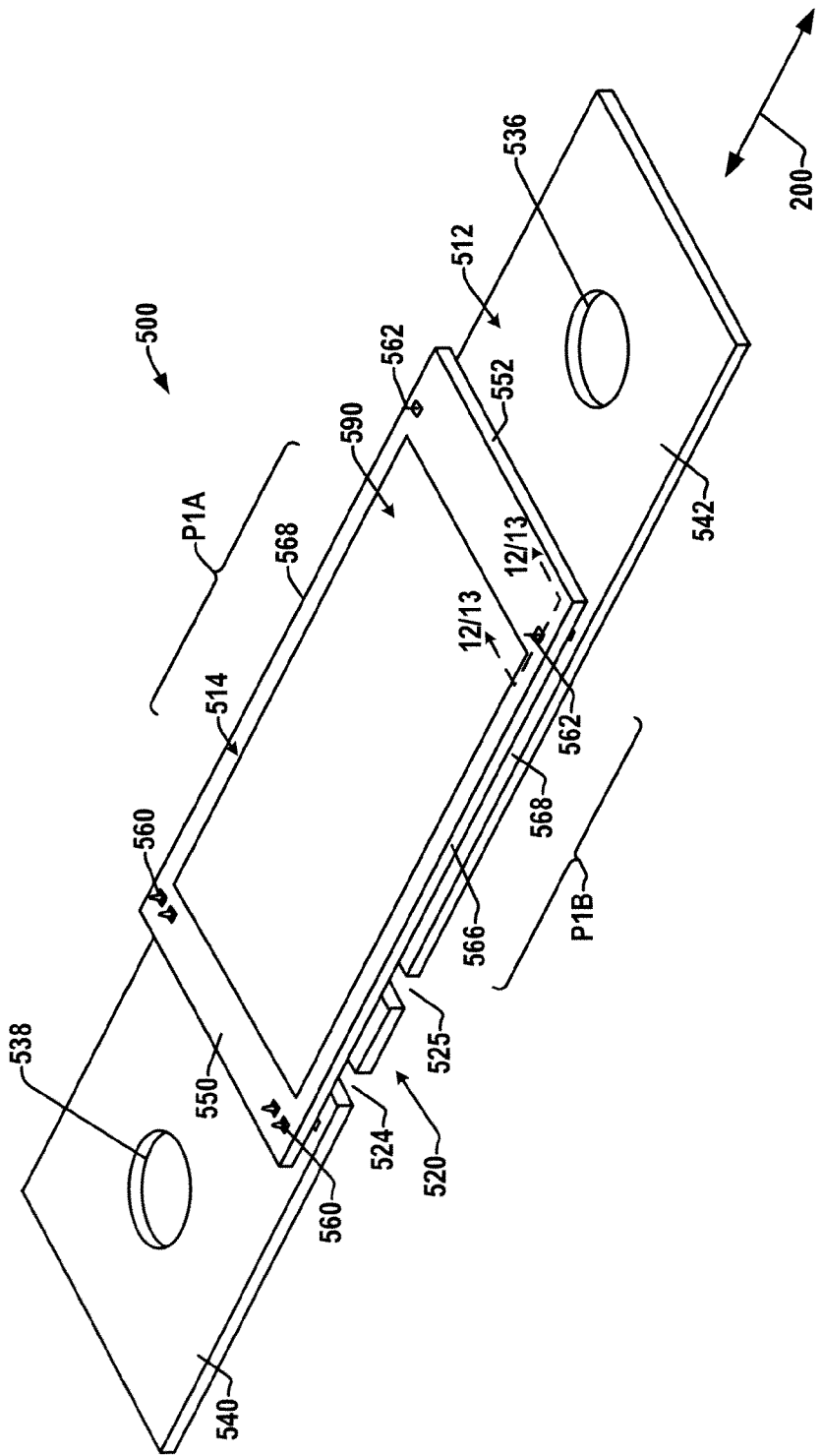
FIG. 11 is a perspective view of a strain and displacement sensor according to another aspect of the invention of this application which includes the board shown in FIG. 10.

Referring also to FIG. 16, an exemplary electrical circuit is shown including the capacitance bridge formed by the interaction of the boards 102 and 104, where the circled portions of the bridge circuit are implemented on the second board 104 (similar to the circled portions 104 in FIGS. 6 and 9). The driver and other circuitry illustrated in FIG. 16, or any portion thereof, may be implemented on the first board 102, with suitable external connections to/from the board 102 to interface the sensor 100 with external equipment. As shown in FIG. 16, the circuitry can include a bridge supply voltage source 702 providing a voltage to a modulator or multiplexer 704 that drives the bridge via coupling capacitor CC1 relative to a circuit connected to the second coupling capacitor CC2. The modulator is operated at a frequency, such as about 80 KHz in one example, via a modulation oscillator 706, although any frequency can be employed, preferably about 10 times the highest mechanical frequency of the structure(s) to which the sensor 100 is mounted. Any alternating drive signal can be provided by the modulator 704, such as a square wave in the illustrated embodiments, although sinusoids and other waveforms may be used. The bridge provides a corresponding pair of square wave outputs at terminals X1 and X2. These alternating signals are 180 degrees output phase and are provided to the inputs of a differential amplifier 708. The differential amplifier output is provided to a demodulator 710, which is also operated at the frequency of the oscillator 706, where the demodulator output is generally a DC signal with a level indicative of the relative positions of the first portions P1A and P1B of the boards 102 and 104. The demodulated output may be filtered using a low pass filter (LPF) 712, and the filtered signal may be amplified via a gain stage amplifier 714. In one embodiment, the amplified output signal is provided to an external connection 716 as an analog output of the sensor 100. In other possible embodiments, the first board 102 may further include an analog-to-digital (A/D) converter 720 that converts the amplified analog signal to provide a digital output representation thereof to a processor component 722 (e.g., microprocessor, microcontroller, etc.), and the processing component 722 may provide transmit values for wireless transmission to a transceiver 724 in wireless implementations of the sensor 100.

Sensor 100 can be attached to an associated structure by any method known in the art including, but not limited to, bolts, an epoxy, and/or embedding the sensor directly into the structure. Further, sensor 100 can be joined between two structures or over a gap in a structure to meter motion or displacement therebetween. When attached to the associated structure (not shown), boards 102 and 104 are able to move relative to each other in direction 200. Thus, when a shear strain is applied to the structure in direction 200, boards 102 and 104 will be displaced a distance relative to each other. That displacement indicates that a strain or a movement is present on the structure. In yet other embodiments, sensor 100 can include an outer covering 220 which can be functional or non-functional. In one embodiment, it can be a flexible and water tight covering to protect the sensor from environmental conditions. In other embodiments, it can be structural wherein it can be used to help determine strain.

Figure 15:
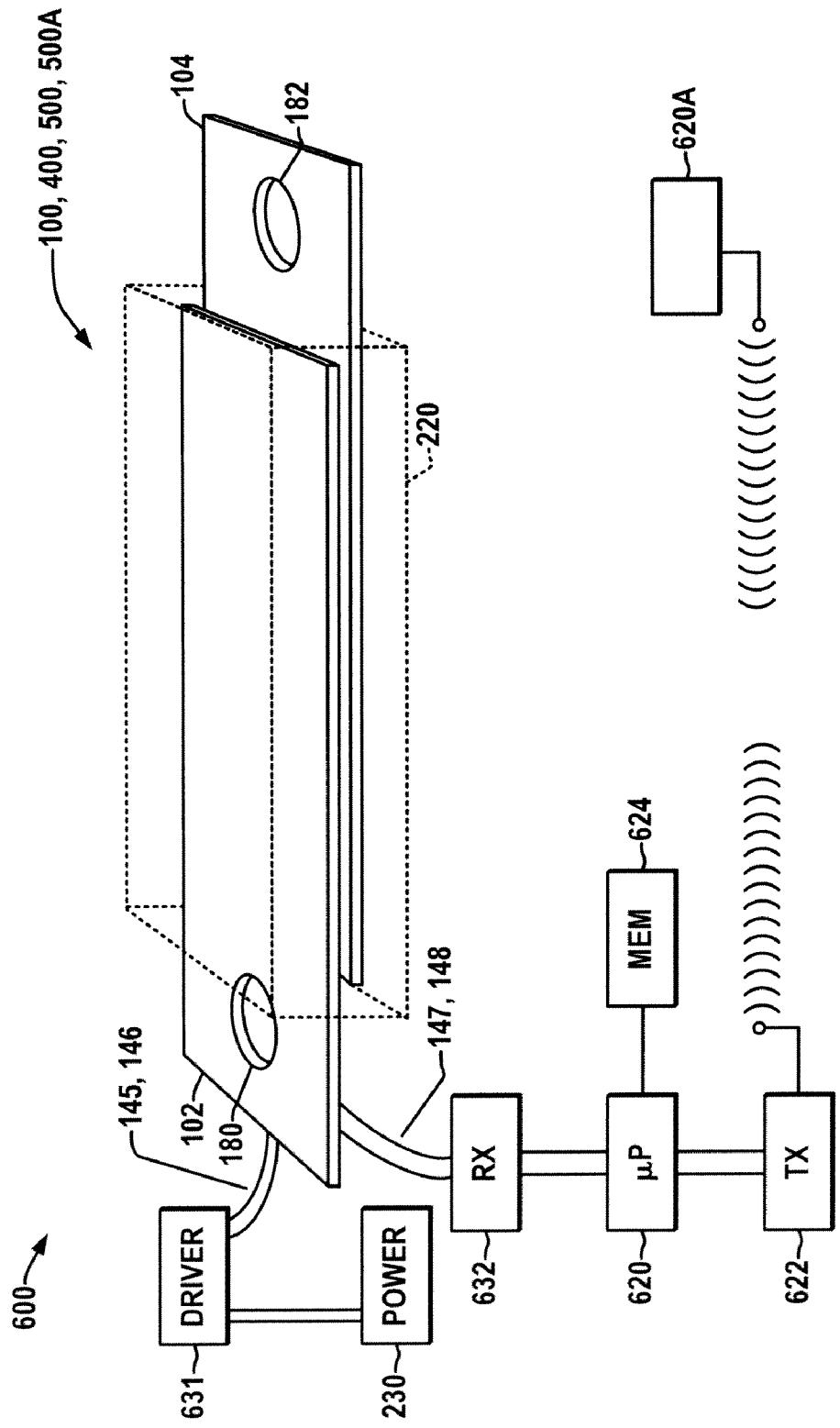
FIG. 15 is schematic view of a system utilizing one or more sensors of the invention of this application.

Referring now to FIGS. 5, 6, and 15, input 120 and input 122 are configured to receive a differential signal Z1 and Z2 and conduct that signal to the positive coupling pad CP1 and the negative coupling pad CP2, respectively. This signal can be produced by a driver source 631 joined to sensor 100 by way of wire leads 145 and 146 (FIG. 15) which can be any driver power source known in the art for producing this kind of signal. The differential signal provides for some noise immunity because any noise will be reflected on both portions of the signal increasing or decreasing the portions by similar amounts. It has been found that the capacitance of capacitors is directly proportional to the amount of area overlapping the two plates of the capacitor, and more capacitance provides more coupling of the signal. Thus, the larger overlapping area of the two plates (pads) the greater the capacitance value of the capacitor and the better coupled the plates are.

When the boards 102 and 104 are in the "home" position, the pads are balanced (i.e. the relative displacement is zero), the pad BP1 is driven by two capacitors C1 and C2 equally, because the area of the pad BP1 overlapping the pad BP2 is equal to the area of the pad BP1 overlapping the pad BP3. Thus, both the portion of the differential signal and the portion of the differential signal drive the positive signal-out pad BP1 equally. Similarly, when the boards are balanced in the "home" position, the negative signal-out pad BP4 is driven by two capacitors C3, C4 equally, because the area of the signal-out pad BP4 overlapping the signal-in pad BP5 is equal to the area of the negative signal-out pad BP4 overlapping the negative signal-in pad BP3. Thus, the resulting differential out signal is zero.

When displacement occurs for any reason, boards 102 and 104 are displaced relative to each other in direction 200A or 200B. When the boards are displaced in direction 200A (FIG. 3), the area of overlap of the pads changes. More of the pad BP4 overlaps the pad BP5 than the pad BP3. Thus, the capacitance of C4 is greater than 14 the capacitance of C3 and more of the signal is coupled to the pad BP4. Conversely, more of the pad BP1 overlaps the pad BP3 than the pad BP2. Thus, the capacitance of C2 is greater than the capacitance of C1 and more of the signal is coupled to the pad BP1. The resulting differential signal has more of the input drive 120 on the output 142 and the input drive 122 on the output 140. This polarity indicates an inward displacement of the sensor in direction 200A and the magnitude of the resulting signal is an indication of the amount of the displacement in direction 200A. When sensor 100 moves in direction 200B (FIG. 4), the area of overlap of the pads also changes. During this movement, more of the pad BP1 overlaps pad BP2 than negative pad BP3. Thus, the capacitance of C1 is greater than the capacitance of C2 and more of the signal is coupled to the pad BP2. In addition, more of the pad BP4 overlaps the pad BP3 than the pad BP5. Thus, the capacitance of C3 is greater than the capacitance of C4 and more of the signal is coupled to the pad BP3. The resulting differential signal has more of the input drive 122 on the output 142 and the input drive 120 on the output 140. This polarity indicates an outward displacement of the sensor in direction 200B.

Again, in certain embodiments, coupling pads CP1 and CP2 on board 102 can be larger than pads CP4 and CP3 on board 104. In these embodiments, this difference in size allows the area of overlap of the coupling capacitors CC1, CC2 to remain constant even when a strain is applied or displacement is made to the associated structure and the boards of the sensor. The area of overlap is constantly equal to the area of the coupling pads CP4 and CP3 of second board 104. However, the opposite could also be used to achieve the same result wherein pads CP4 and CP3 are enlarged to maintain coupling capacitors CC1, CC2 at a constant value.

Figure 7:
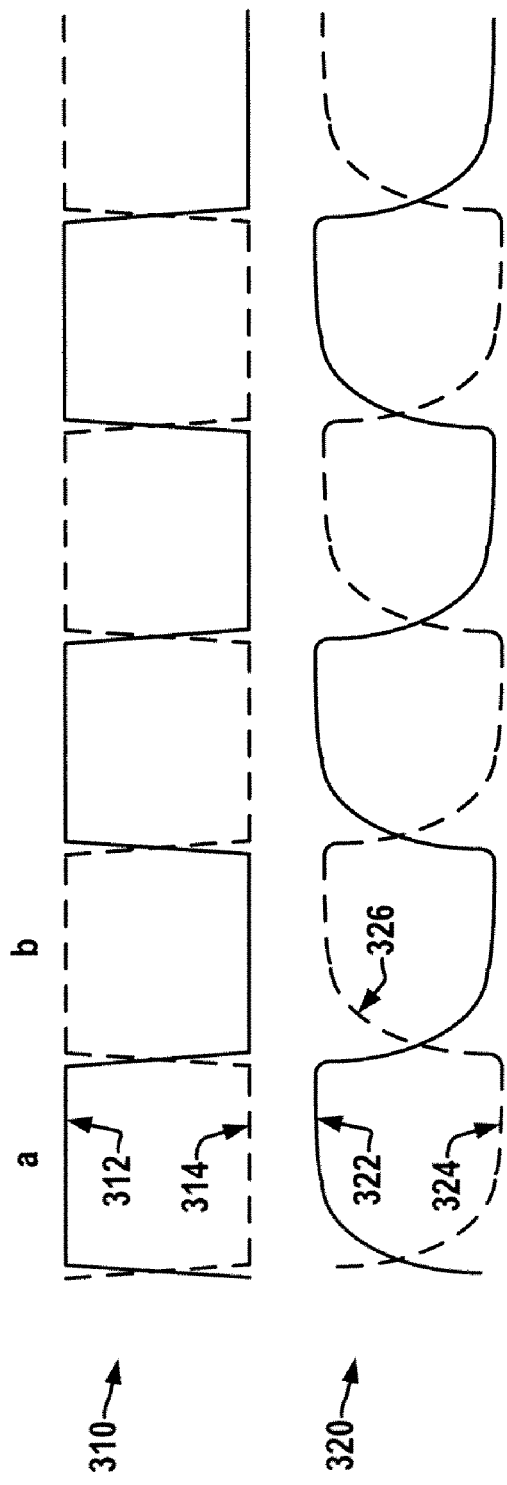
FIG. 7 is a graph illustrating two waveforms in the sensor of FIGS. 1-6.

With reference to FIG. 7, illustrated are certain waveforms that can be the result of movement of the boards 102, 104 of the sensor 100. The top graph 310 shows three cycles of an oscillating differential signal in the form of a square wave, with the solid line 312 representing the signal on coupling pad CP1 while the dotted line 314 represents the signal on pad CP2. The bottom graph 320 illustrates three cycles of the resulting bridge output signals 322 and 324. With waveforms 312 on Z1 and 314 on Z2, and the sensor offset in direction 200a, the output waveforms will have the polarities shown with X1 being 324 and X2 being 322. When the bridge is balanced, waveforms 322 and 324 are zero. With the sensor offset in direction 200b, the output waveforms will have the polarities shown with X1 being 322 and X2 being 324. In these embodiments, the absolute magnitude of the resulting demodulated (and optionally filtered) signal is used to determine the length of displacement and the pad on which the signal is indicates the direction of displacement. The noise reduction of the differential signal is not available in the single-ended input embodiment, thus noise introduced into the sensor 100 will propagate throughout.

Figure 8:
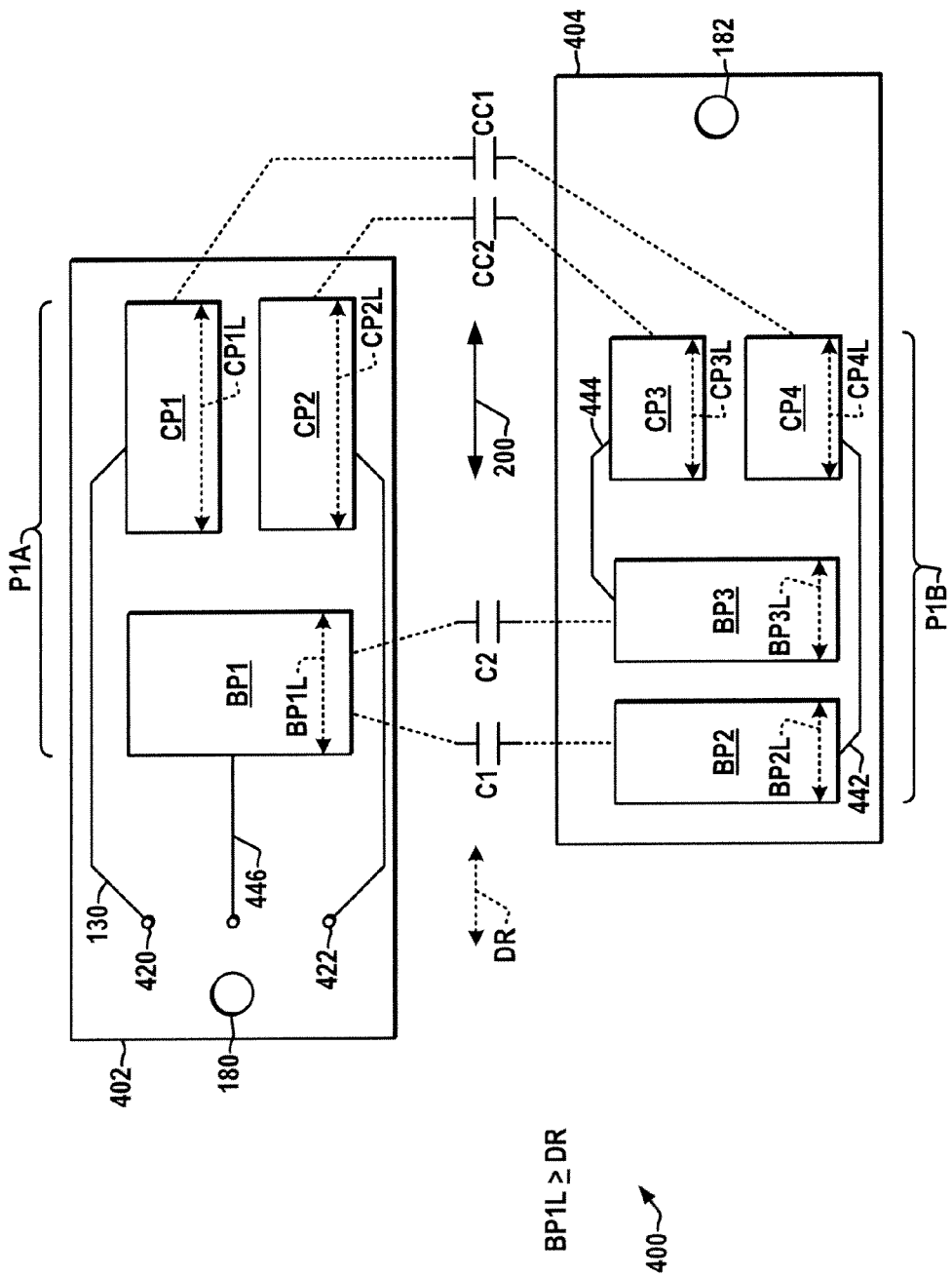
FIG. 8 is a top view of boards relating to another embodiment of the invention of this application.

With reference to FIGS. 8 and 9 illustrated are yet other embodiments of the sensor of this application. More particularly, shown is a sensor 400 which creates a capacitance half-bridge instead of the sensor 100 described above. Like reference numbers are utilized for common elements in these embodiments; however, this is not intended to limit the embodiments shown in these figures.

Sensor 400 includes boards 402 and 404. Like sensor 100, sensor 400 can use a differential input signal, but only one signal-out pad BP1 is used. The operation of the half-bridge works similar to the full-bridge described above in relation to the path for the positive signal-out pad BP4, but results in a single-ended output 446 instead of the differential output 142, 140 of the full-bridge embodiment. The single-ended output may suffer from noise issues as mentioned above.

Further embodiments can include one or more additional boards (not shown) or other structural objects (also not shown). These additional boards can be used for a wide range of purposes including protection purposes wherein external or outer boards could be used to help strengthen and/or isolate the internal boards referenced in this application. Further, the additional boards or other structural components could be configured to protect the first and second boards from physical vibrations, which may affect the electronics (e.g. signal driver, power circuit, summing circuit) on the first board. In addition, in yet other embodiments, these other board could be use to mount additional electronics necessary to operate the invention of this application or to even operate other electronic devices beyond that of the invention of this application without detracting from the invention of this application.

In yet other embodiments, one or more of the boards can include a deformable board portion. In this respect, and with reference to FIGS. 10-13, and 17 shown is sensor 500 and 500A which can include one or more of the structures of the other embodiments in this application, but which includes one or more deformable boards. Sensor 500 includes a deformable board 512 along with a rigid board 514. Either one of these boards can be the electronics board or the isolated board without detracting from the invention of this application. In the embodiment shown, board 514 is the electronics board and board 512 is the isolated board. In the interest of brevity, additional detail on the electronics will not be discussed at this point in that it is fully discussed above.

Board 512 includes a deformation or spring section 520 which can be formed by the board itself as is shown in the drawings or can be a separate component of the board without detracting from the invention of this application. As is shown, spring section 520 includes a series of side openings 522-525 and a central opening 530. However, while only one central opening is shown in connection with four side openings, the invention of this application is not to be limited to this arrangement in that other spring opening arrangements can be used. Further, as can be appreciated, the size and number of openings can utilized to control the spring rate of the section thereby, at least partially, controlling the potential deflection of the board which will be discussed in greater detail below.

In this arrangement, board 512 includes both mounting openings 536 and 538 for mounting the sensor to the desired structure. This can be accomplished in that board 512 includes spring section 520 such that the compression of this section allows for the relative movement of the conductive pads on the respective displaceable board portions of the boards as is discussed above in greater detail. In this respect, board 512 includes both a stationary or fixed portion 540 and a movement or displaceable portion 542 such that movement portion 542 can move relative to stationary portion 540 by way of the deflection of spring section 520. Board 514 is joined to board 512 such that it is generally fixed relative to stationary board portion 540 and movement portion 542 is allowed to move relative to both portion 540 and board 514 as spring section 520 is either compressed or extended. Thus, board 512 can have both mounting holes 536 and 538 while still allowing for the system to measure strain and/or displacement as is discussed in greater detail above. As with all embodiments, mounting holes 536 and 538 represent only one of the many ways in which the sensors of this application can be joined to the object to be monitored wherein any mounting arrangement known in the art could be utilized without detracting from the invention of this application.

In order to allow the relative movement of portion 542, multiple fastening arrangements can be utilized to join the boards. In this respect, board 514 can be a generally rectangular board extending in direction 200 between ends 550 and 552 wherein end 550 is positioned over portion 540 and end 552 is positioned over portion 542. Board 514 includes side edges 556 and 558 extending between ends 550 and 552. Sensor 500 further includes one or more rigid fasteners 560 which join end 550 relative to fixed portion 540 and one or more flexible fasteners 562 which join end 552 relative to movement portion 542. In one embodiment, fixed fasteners 560 are pin fasteners that are pins fastened into corresponding holes or openings in the boards and these pins can be secured by any means in the art including, but not limited to, solder and adhesives. Further, other fastening systems known in the art could be used for these fasteners without detracting from the invention of this application.

Figure 12:
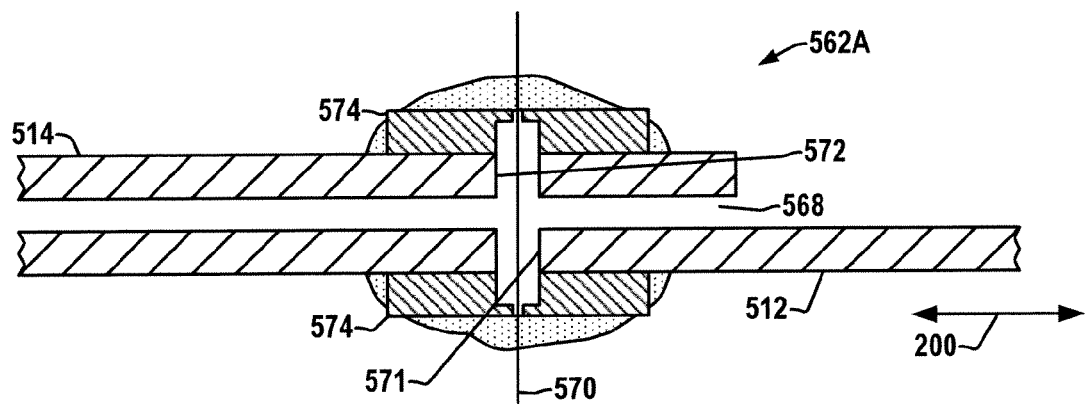
FIG. 12 is a sectional view taken along line 12-12 in FIG. 11.
Figure 13:
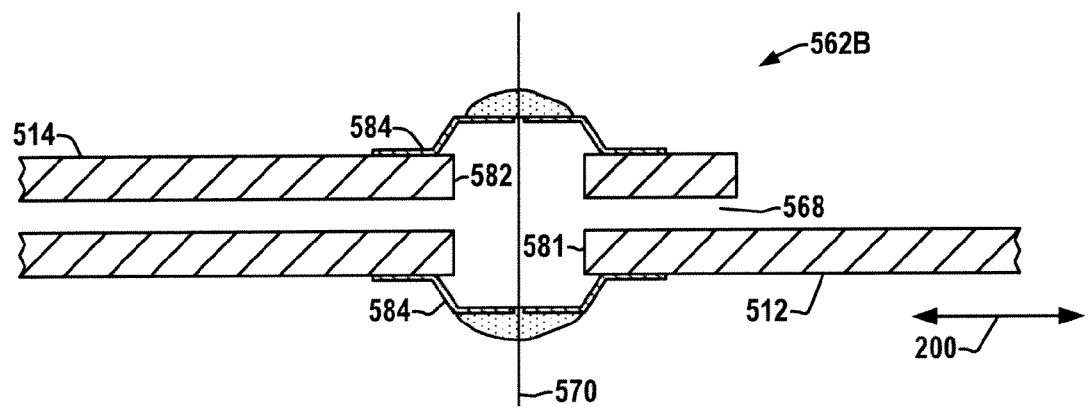
FIG. 13 is another sectional view taken along line 12-12 in FIG. 11 showing yet another embodiment.

Flexible fasteners 562 can formed as is shown in FIGS. 12 and 13 wherein fastening arrangements 562A and 562B are shown. Further, other flexible fastening arrangements known in the art could be used to allow the relative movement of portion 542 of board 512. In arrangement 562A, the fastener includes a flexible wire 570 secured to both boards. As with fastener 560, wire 570 can be utilized to form and/or maintain a gap between the boards which will be discussed below. Wire 570 can be joined to boards by any means known in the art including, but not limited to, adhesives and solder. In order to allow increased relative motion, boards 512 and 514 can include oversized holes 571 and 572, respectively, along with washers 574. This arrangement allows for a greater range of motion for wire before the wire encounters any obstacles. Similarly, arrangement 562B includes spring wire 570, but includes larger openings or holes 581 and 582 in boards 512 and 514, respectively, to allow for an even greater range of motion. Further, arrangement 562B includes enlarged washers 584 to help enhance this greater range of motion.

As is discussed in greater detail above, the pads of boards 512 and 514 are electronically isolated from one another to form the capacitive network from the conductive pads on the respective boards. Accordingly, sensor 500 includes a non-conductive, dielectric or spacing layer 568 between boards 512 and 514. As with other embodiments of this application, Layer 568 can be any known dielectric including, but not limited to an air gap between the boards. Fasteners 560 and 562 can be utilized to maintain a desired gap between the boards. Further, this spacing can also be maintain in full or in part by other spacing techniques including, but not limited to washers and spacing rails (not shown). As with other embodiments of this application, the spacing between the boards can be any spacing that prevents the direct electrical contact between the pads. It has been found that this gap can be approximately 10-20 Mils. In other embodiments, the spacing can be greater or less than the 10-20 Mils.

Figure 14:
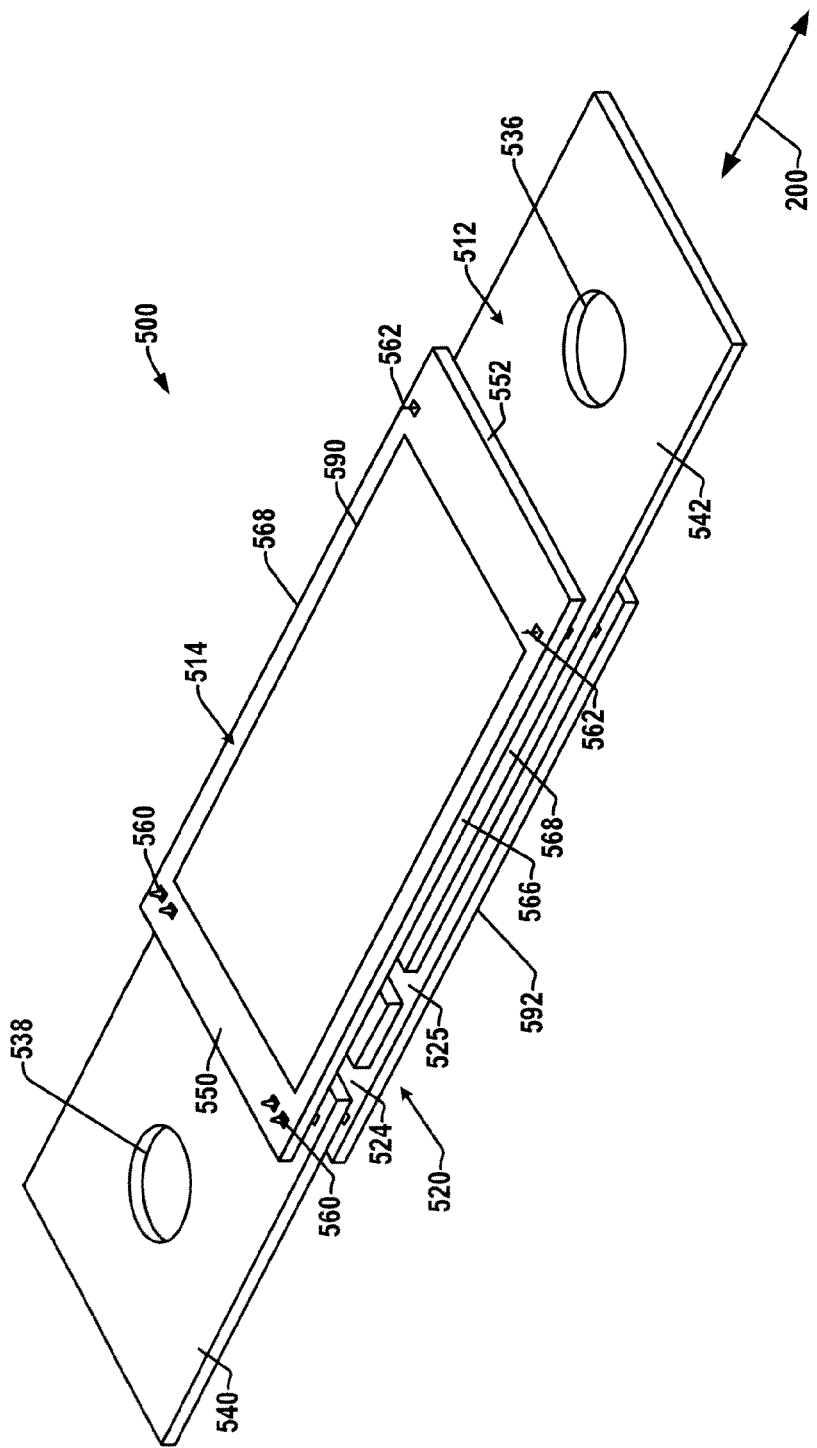
FIG. 14 is a perspective view of a strain and displacement sensor according to another aspect of the invention of this application which includes a third board.

As with other embodiments of this application, one or more of the boards can support some or all of the electronics of sensor 500. In this particular embodiment, board 514 can include electronics area 590 that can be utilized to support some or all of the electronics for the capacitive network. With reference to FIG. 14, additional boards, such as board 592, could also be included to support additional electronics. These additional electronics could be for the capacitive network or could be for other purposes including, but not limited to, memory stores, power sources, transceivers or other electronics needed to form an operating system for monitoring an object as will be discussed in greater detail below.

Figure 17:
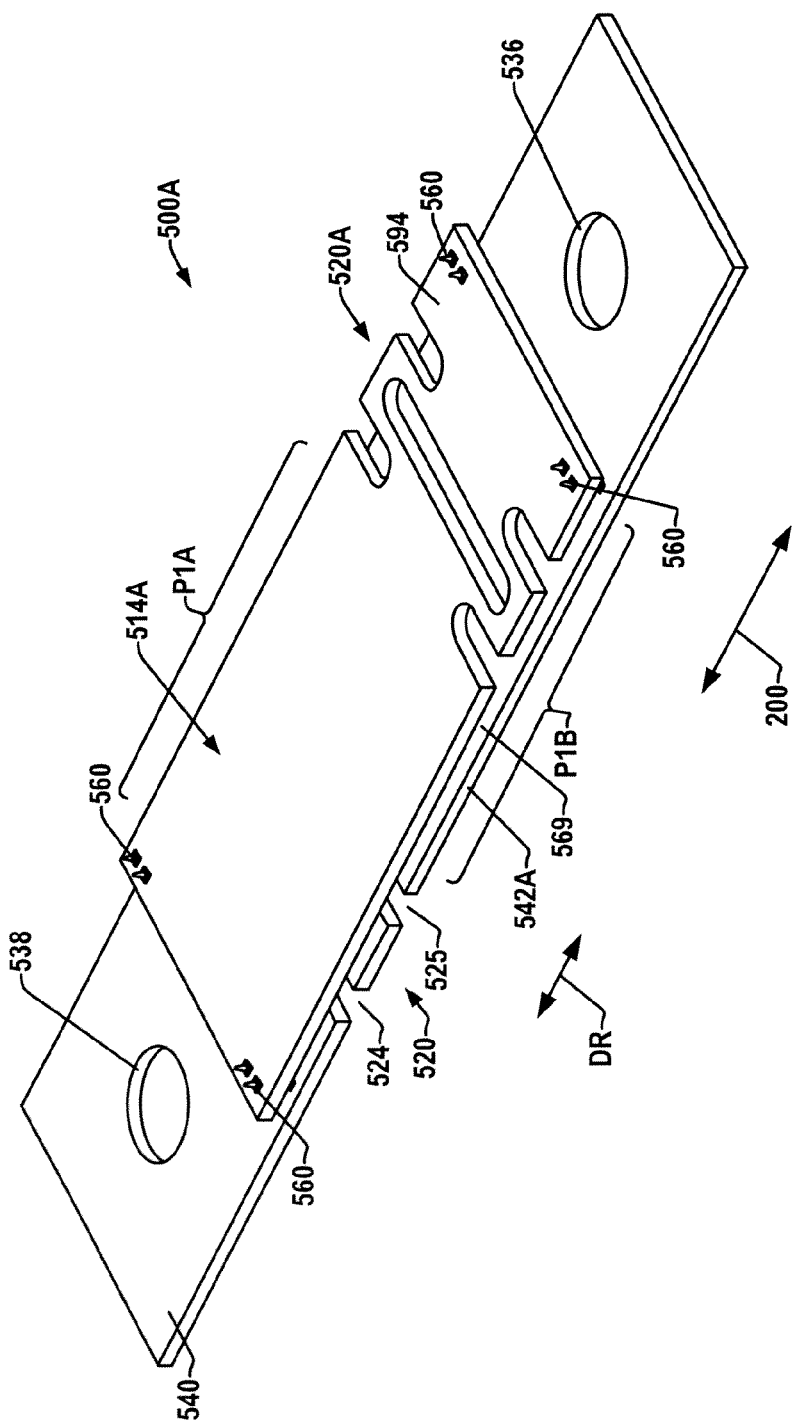

With reference to FIG. 17, sensor 500A is shown which includes both board 512 as is discussed above, but also board 514A which also includes a spring section 520A. In this arrangement, both boards 512 and 514A can deflect or deform when a load is applied in that sensor 500A includes multiple spring sections 520 and 520A. In this embodiment, fasteners 562 are replaced by fasteners 560 which can be rigid fasteners as with the embodiments described above. As a result, board 514A includes a stationary or fixed portion 594 and a movement or displaceable portion P1A. Similarly, board 512 includes a stationary portion 540 and a movement or displacement portion P1B. Thus, in this sensor arrangement, portions P1A and P1B move relative to one another when a load is applied.

As with other sensors of this application, sensor 500A is for detecting displacement and/or strain in an associated structure, which includes first and second boards 512 and 514A, respectively, mounted to allow relative motion of at least first portions P1A and P1B thereof, respectively, along displacement direction 200 for selectively changing capacitances created by dielectric material situated between inwardly facing conductive pads on the boards 512, 514A. The capacitances thus created are coupled in a full or half-bridge circuit together with coupling capacitors allowing measurement or detection of the relative board positions by bridge capacitance measurement techniques. However, in that board 512 and 514A both include internal spring portions 520 and 520A, respectively, portions of the board remain stationary relative to one another while others, P1A and P1B, move relative to one another for allowing the capacitance detections. As this is discussed in detail above, it will not be discussed with respect to this embodiment in the interest of brevity.

With reference to FIG. 15, shown is a system 600 that can include one or more of the strain sensors and/or displacement sensors of this application including, but not limited to sensors 100, 400, 500 and/or 500A. System 600 can utilized any embodiments of this application or even multiple embodiments of the invention of this application where the sensor is only shown to illustrate the concept of the monitoring system and this system should not be limited to this particular arrangement. This system could be, for example only, multiple sensors positioned along a single crack such that these sensors work together to monitor the crack with separate and spaced sensors functioning independently of one another to generate an overall picture of the movement of the particular crack. Similarly, the system could be one or more sensors embedded in a structural object such as a drilled and/or driven piles. However, it has been found that some sensors work better than others for certain applications. For example only, it has been found that sensor 100 works better for larger applications, such as cracks, while the spring style boards (such as sensor 500) can work better for measuring strain.

System 600 can include one or more operational components such as a processor or computer or processer 620 joined to sensor 100, 400, 500, 500A by way of a communication wire or wirelessly and this can be any communication device known in the art. Further, computer 620 can be any computing system known in the art to evaluate information and/or store information and computer 620 can be a local computer or operating system that is directly linked to the sensors or can be a remote computer or operating system communicating with the sensors by way of a transceiver 622. Thus, the processor 620 could be a local processor on or near the sensor, an onsite processor in communication with the sensor and/or an offsite processor. In any of these embodiments, the system can include a memory storage device 624 in anyone or more of these locations which can be a part of computer 620 or which can be a separate device as is shown. Further, each of the sensors can include a separate operating system without detracting from the invention of this application.

The computer 620 can be utilized to merely monitor system 600 and/or could be used to control the system wherein the communication can be either one way communication or even two way communication. Further, by including transceiver 622, a structure can be monitored at any location continuously such that minute-by-minute movements or disturbances can be accurately tracked. This can include, but is not limited to, remotely monitoring the system at an on or offsite location wherein multiple sites and multiple regions of a single site could be remotely monitored at a monitoring station that can be located anywhere around the globe. Or, this could be operating the system at a remote location wherein, as is referenced above, this communication could be one way communication and/or two way communication. Thus, in yet other embodiments, system 600 could also include a computing device 620A at a remote location (on or offsite) that can merely monitor and/or store data or which could be used to allow the two way communication. Further, while the drawing indicates wireless transceiver devices, communication on site or with offsite locations can be by any method known in the art including, but not limited to, wired communication and wireless communications.

The sensors and/or system 600 can further include individual sensor power supplies and/or a system power supply 630, a driver circuit 631 powered by the supply 630, and a receiver 632. Again, a single power supply, driver, and receiver can be used for multiple sensors when multiplexed between sensors and/or each sensor could be self contained.

As can be appreciated, the size of the sensors of this application can depend on the application of the sensor. For example, for sensor used to monitor the movement of a crack, the size of this crack could determine the size of the sensor in that the sensor must extend from one side of the crack to the other side of the crack. While one size sensor could be utilized for multiple crack sizes, multiple sizes could be needed. Thus, this application is not limited to any particular size of sensor or the use of one size sensor for all of the sensors used in system 600. Similarly, embedded sensors can be used for a wide range of applications where the mounting holes of the sensor can be joined to rebar in a structure to be monitored. As with the crack sensors, the embedded sensors can also come in different sizes based on a number of factors including, but not limited to, the spacing of the rebar and the forces and/or displacement to be monitored.

Yet even further, these sensors can be used for both static testing and dynamic testing. In this respect, the sensors of this application can be mounted and/or embedded in a structure to monitor or test the movement or strain of the object after installation. This includes, but is not limited to, using one or more imbedded sensors to test a drilled and poured pile after installation. The sensors can also be used to monitor the installation of a driven pile wherein the sensor is embedded or positioned relative to the pile being driven such that the driving process can be monitored. As with all embodiments of this application, this can include monitoring techniques that include other devices that can be separate from the sensors of this application or mounted to the sensors of this application.

Further, while not shown, any of these other devices can be mounted directly to the sensor without detracting from the invention of this application. Yet even further, the power source could be any type of energy harvesting equipment including, but not limited to solar cells. This can produce a short and/or long term power source for the sensor and/or the other related devices even in remote locations that do not have accessible power supplies.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. These combinations include, but are not limited to, combining a tank with an inner vessel arrangement.

Accordingly, it is to be distinctly understood that the foregoing descriptive matter is to be interpreted merely as illustrative of the invention and not as a limitation.

The following is claimed:

1. A sensor for detecting displacement in an associated structure, the sensor comprising:
 a first board having a first substrate with an inwardly facing surface extending in a displacement direction between a first end and a second end (204), the first board having a first portion including:
  a first electrically conductive coupling capacitor pad on the inward surface of the first board and coupled with a first input,
  a second electrically conductive coupling capacitor pad on the inward surface of the first board and coupled with a second input, and
  a first electrically conductive bridge capacitor pad on the inward surface of the first board and coupled with a first output;
 a second board having a second substrate with an inwardly facing surface extending in the displacement direction between a first end and a second end, the second board being spaced from the first board with the inwardly facing surfaces of the boards facing one another and forming a gap therebetween, the second board including a first portion including:
  a third electrically conductive coupling capacitor pad on the inward surface of the second board, at least a portion of the third coupling capacitor pad facing at least a portion of the second coupling capacitor pad of the first board to form a second (CC2) coupling capacitor via a dielectric in the gap between the boards,
  a fourth electrically conductive coupling capacitor pad on the inward surface of the second board, at least a portion of the fourth coupling capacitor pad facing at least a portion of the first coupling capacitor pad of the first board to form a first (CC1) coupling capacitor via the dielectric in the gap between the boards,
  a second electrically conductive bridge capacitor pad on the inward surface of the second board and coupled with one of the third and fourth coupling capacitor pads, at least a portion of the second bridge capacitor pad facing at least a first portion of the first bridge capacitor pad of the first board to form a first bridge capacitor via the dielectric in the gap between the boards, and
  a third electrically conductive bridge capacitor pad on the inward surface of the second board and coupled with the other one of the third and fourth coupling capacitor pads, at least a first portion of the third bridge capacitor pad facing at least a second portion of the first bridge capacitor pad of the first board to form a second bridge capacitor via the dielectric in the gap between the boards;
 at least one mounting structure supporting the first and second boards relative to one another with one of the first portions of the first and second boards being displaceable relative to the other first portion throughout a displacement range in the displacement direction such that capacitances of the first and second bridge capacitors vary as the first portions of the first and second boards are displaced relative to one another throughout at least a portion of a displacement range in the displacement direction.

2. The sensor of claim 1: wherein the first board further comprises a fourth electrically conductive bridge capacitor pad on the inward surface of the first board and coupled with a second output, at least a first portion of the fourth bridge capacitor pad facing at least a second portion of the third bridge capacitor pad of the second board to form a third bridge capacitor via the dielectric in the gap between the boards;
 wherein the second board further comprises a fifth electrically conductive bridge capacitor pad on the inward surface of the second board and coupled with the one of the third and fourth coupling capacitor pads, at least a portion of the fifth bridge capacitor pad facing at least a second portion of the fourth bridge capacitor pad of the first board to form a fourth bridge capacitor via the dielectric in the gap between the boards; and
 wherein the at least one mounting structure supports the first and second boards relative to one another with one of the first portions of the first and second boards being displaceable relative to the other first portion throughout the displacement range in the displacement direction such that capacitances of the first, second, third, and fourth bridge capacitors vary as the first portions of the first and second boards are displaced relative to one another throughout at least a portion of a displacement range in the displacement direction.

3. The sensor of claim 2, where the first and second coupling capacitors remain constant as the first portions of the first and second boards are displaced relative to one another throughout at least a portion of the displacement range in the displacement direction.

4. The sensor of claim 2, wherein the dielectric in the gap between the boards is air.

5. The sensor of claim 2, further comprising a dielectric material disposed between the first and second boards.

6. The sensor of claim 5, the sensor of claim 5, wherein the dielectric material is formed on one of the inwardly facing surfaces of the first and second boards.

7. The sensor of claim 2, wherein the second board includes no external electrical connections.

8. The sensor of claim 2, wherein the first and second boards have no electrically conductive connections therebetween.

9. The sensor of claim 2, wherein at least one of the first and second boards includes a spring portion, a fixed portion on one side of the spring portion and a displacement portion on the other side of the spring portion, the fixed portion be fixed relative to the other board and the displacement portion being displaceable in the displacement direction relative to the other board.

10. The sensor of claim 1, where the first and second coupling capacitors remain constant as the first portions of the first and second boards are displaced relative to one another throughout at least a portion of the displacement range in the displacement direction.

11. The sensor of claim 1, wherein the dielectric in the gap between the boards is air.

12. The sensor of claim 1, further comprising a dielectric material disposed between the first and second boards.

13. The sensor of claim 12, wherein the dielectric material is formed on one of the inwardly facing surfaces of the first and second boards.

14. The sensor of claim 1, wherein the second board includes no external electrical connections.

15. The sensor of claim 1, wherein the first and second boards have no electrically conductive connections therebetween.

16. The sensor of claim 1, wherein at least one of the first and second boards includes a spring portion, a fixed portion on one side of the spring portion and a displacement portion on the other side of the spring portion, the fixed portion be fixed relative to the other board and the displacement portion being displaceable in the displacement direction relative to the other board.

17. A system of monitoring the displacement or strain of a structure, the system comprising the sensor of claim 1, the system further including a communication device.

18. The system according to claim 17 wherein in the communication device includes a transceiver.

19. The system according to claim 17 wherein the system includes a plurality of sensors.

* * * * *